(12) United States Patent
Vasudevan

(10) Patent No.: US 7,332,532 B2
(45) Date of Patent: Feb. 19, 2008

(54) POLYMERIC DISPERSANTS FOR INK-JET APPLICATIONS

(75) Inventor: Sundar Vasudevan, Corvallis, OR (US)

(73) Assignee: Hewlett-Packard Development, L.P., Houston, TX (US)

( * ) Notice: Subject to any disclaimer, the term of this patent is extended or adjusted under 35 U.S.C. 154(b) by 302 days.

(21) Appl. No.: 10/824,173

(22) Filed: Apr. 13, 2004

(65) Prior Publication Data

US 2005/0228071 A1 Oct. 13, 2005

(51) Int. Cl.
- C09D 11/10 (2006.01)
- C08K 9/10 (2006.01)
- C08L 27/12 (2006.01)
- C08L 33/02 (2006.01)
- C08L 25/02 (2006.01)

(52) U.S. Cl. ............ 523/160; 523/205; 524/544; 524/556; 524/577; 524/609

(58) Field of Classification Search ............. 523/160, 523/161
See application file for complete search history.

(56) References Cited

U.S. PATENT DOCUMENTS

| | | | |
|---|---|---|---|
| 3,992,343 A | 11/1976 | Haschke et al. | |
| 4,198,332 A | 4/1980 | Laqua et al. | |
| 4,552,939 A | 11/1985 | Thaler et al. | |
| 4,818,783 A | 4/1989 | Shioji et al. | |
| 5,280,095 A | 1/1994 | Aizawa et al. | |
| 5,554,739 A | 9/1996 | Belmont | |
| 5,556,583 A | 9/1996 | Tashiro et al. | |
| 5,640,187 A | 6/1997 | Kashiwazaki et al. | |
| 5,707,432 A | 1/1998 | Adams et al. | |
| 5,854,308 A * | 12/1998 | Kuo et al. | 523/161 |
| 5,955,515 A | 9/1999 | Kimura et al. | |
| 6,077,900 A | 6/2000 | Boudreaux et al. | |
| 6,232,405 B1 | 5/2001 | Schmidhauser et al. | |
| 6,281,267 B2 * | 8/2001 | Parazak | 523/160 |
| 6,323,257 B1 | 11/2001 | Moffatt et al. | |
| 6,426,375 B1 * | 7/2002 | Kubota | 523/160 |
| 6,498,222 B1 * | 12/2002 | Kitamura et al. | 526/307.2 |
| 6,500,875 B2 | 12/2002 | Noguchi | |
| 6,602,333 B2 | 8/2003 | Miyabayashi | |
| 6,613,814 B2 | 9/2003 | Ishizuka et al. | |
| 6,652,084 B1 | 11/2003 | Teraoka et al. | |
| 6,677,398 B2 | 1/2004 | Egolf et al. | |
| 6,730,149 B2 * | 5/2004 | Arita et al. | 106/31.27 |
| 6,790,878 B2 * | 9/2004 | Kurabayashi | 523/160 |
| 6,864,302 B2 * | 3/2005 | Miyabayashi | 523/160 |
| 7,074,843 B2 * | 7/2006 | Nakamura et al. | 523/205 |
| 2003/0177943 A1 * | 9/2003 | Auweter et al. | 106/31.28 |
| 2003/0195274 A1 * | 10/2003 | Nakamura et al. | 523/160 |
| 2004/0212667 A1 * | 10/2004 | Nishiguchi | 347/96 |

FOREIGN PATENT DOCUMENTS

| | | | |
|---|---|---|---|
| EP | 0 556 649 A1 | | 8/1993 |
| EP | 0 822 238 A2 | | 2/1998 |
| EP | 1077238 A1 | * | 2/2001 |
| WO | WO 00/20520 | | 4/2000 |
| WO | WO 02/26892 | * | 4/2002 |
| WO | WO 2004/000916 | | 12/2003 |
| WO | WO 2004/003090 | | 1/2004 |

* cited by examiner

Primary Examiner—Callie Shosho

(57) ABSTRACT

An ink-jet ink which includes a liquid vehicle and a polymer-dispersed pigment dispersed in the liquid vehicle is disclosed and described. More specifically, the polymer-dispersed pigment can include a pigment encapsulated with a polymer having hydrophilic and hydrophobic moieties. The polymer can be a polymerization product of at least a first monomer having a hydrophilic group, and a second monomer having a hydrophobic group. Further, the polymer can be configured such that the polymer-dispersed pigment is stable in the liquid vehicle at a pH of from about 5.5 to about 8.5. Such polymer-dispersed pigments allow for formation of ink-jet inks with improved options for bleed control mechanisms and increased reliability of ink-jet architecture.

26 Claims, No Drawings

POLYMERIC DISPERSANTS FOR INK-JET APPLICATIONS

FIELD OF THE INVENTION

The present invention relates generally to ink-jet ink compositions. More particularly, the present invention relates to polymer-dispersed pigments and associated ink-jet inks.

BACKGROUND OF THE INVENTION

There are several reasons that ink-jet printing has become a popular way of recording images on various media surfaces, particularly paper. Some of these reasons include low printer noise, capability of high-speed recording, and multicolor recording. Additionally, these advantages can be obtained at a relatively low price to consumers. Though there has been great improvement in ink-jet printing, accompanying this improvement are increased demands by consumers in this area, e.g., higher speeds, higher resolution, full color image formation, increased stability, improved durability, etc.

As new ink-jet inks are developed, there have been several traditional characteristics to consider when evaluating the ink in conjunction with a printing surface or substrate. Such characteristics include edge acuity and optical density of the image on the surface, black-to-color bleed control, dry time of the ink on the substrate, adhesion to the substrate, lack of deviation in ink droplet placement, presence of all dots, waterfastness, long term storage stability, and long term reliability without corrosion or nozzle clogging, and long term print durability. Though the above list of characteristics provides a worthy goal to achieve, there are difficulties associated with satisfying all of the above characteristics. Often, the inclusion of an ink component meant to satisfy one of the above characteristics can prevent another characteristic from being met. Thus, most commercial inks for use in ink-jet printers represent a compromise in an attempt to achieve at least an adequate response in meeting all of the above listed requirements.

For example, ink-jet inks containing pigments generally require a relatively high pH in order to keep the pigments dispersed within the ink-jet ink. Acrylic acid copolymers are commonly used to disperse pigments in aqueous ink-jet inks. These copolymers typically have carboxylic acids which help to stabilize the pigments, but which also have a high pKa. Therefore, depending on the specific formulation, as the pH drops below about 9, electrostatic stabilization provided by the carboxylate groups decreases. As a result, the pigments are no longer properly dispersed and tend to flocculate and settle. Further, ink-jet inks with high pH can cause excessive corrosion or degradation of various parts of the ink-jet pen architecture. In addition, upon long term storage of initially stable dispersions, carbon dioxide can be absorbed into the ink-jet ink composition causing the pH to drift downward, resulting in a gradual loss of a stable pigment dispersion.

Methods have been sought to avoid these problems with varying success. For example, pigments have been dispersed using cationic polymers or a variety of steric stabilization components to prevent pigments from coagulating. Such methods often result in very low, i.e. acidic, pH in which the ink-jet pen is also susceptible to corrosion. As such, investigations continue in improving these characteristics, while also maintaining good ink-jet architecture reliability.

SUMMARY OF THE INVENTION

It has been recognized that it would be advantageous to develop pigmented ink-jet ink compositions which are stable at near neutral pH ranges. These advantages and other benefits can be realized using an ink-jet ink which includes a liquid vehicle and a polymer-dispersed pigment dispersed in the liquid vehicle. More specifically, the polymer-dispersed pigment can include a pigment encapsulated with a polymer having hydrophilic and hydrophobic groups. In one aspect, the polymer can be a polymerization product of at least a first monomer having a hydrophilic group, and a second monomer having a hydrophobic group. Further, the polymer can be configured such that the polymer-dispersed pigment is stable in the liquid vehicle at a pH from about 6 to about 8. Such polymer-dispersed pigments allow for formation of ink-jet inks with improved options for bleed control mechanisms and increased reliability of ink-jet architecture.

In another aspect of the present invention, the described ink-jet inks can be incorporated into one or more ink-jet pens. A system for printing an image can include a substrate and at least one of such ink-jet ink-containing ink-jet pens.

Additional features and advantages of the invention will be apparent from the detailed description which illustrates, by way of example, features of the invention.

DETAILED DESCRIPTION OF THE PREFERRED EMBODIMENT(S)

Before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a an," and "the" include plural referents unless the context clearly dictates otherwise. Thus, for example, reference to "a pigment" includes reference to one or more of such materials.

As used herein, "liquid vehicle" is defined to include liquid compositions that can be used to carry colorants, including pigments, to a substrate. Liquid vehicles are well known in the art, and a wide variety of ink vehicles may be used in accordance with embodiments of the present invention. Such liquid vehicles may include a mixture of a variety of different agents, including without limitation, surfactants, solvents, co-solvents, buffers, biocides, viscosity modifiers, sequestering agents, stabilizing agents, and water. Though not part of the liquid vehicle per se, in addition to the colorants, the liquid vehicle can carry solid additives such as polymers, latex particulates, UV curable materials, plasticizers, salts, etc.

As used herein, "pigment" refers to a colorant particle which is typically substantially insoluble in the liquid vehicle in which it is present.

As used herein, "self-dispersed pigment" refers to pigments that have been functionalized with dispersing agent, such as by chemical attachment or attraction of the dispersing agent to the surface of the pigment. The dispersing agent can be a small molecule or a polymer. In one embodiment, dispersing agents can be attached to such pigments to provide the outer shell of the pigment with a charge, thereby creating a repulsive nature that reduces agglomeration of pigment particles within the liquid vehicle.

As used herein, "polymer-dispersed pigment" refers to a type of self-dispersed pigment wherein the pigment is at least partially encapsulated by a polymer. The polymer can be covalently attached to the pigment surface, either directly or via an intermediate attachment group, or can be attached through intermolecular attractive forces.

As used herein, "encapsulated" indicates that the pigment is at least partially covered by the polymer, and in some cases can be substantially completely covered. The polymer can physically surround the pigment and be attached thereto by covalent bonds and/or intermolecular attractive forces.

As used herein, "stable" indicates that a pigment remains dispersed over an extended period of time, e.g., a useful commercial shelf-life.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

In accordance with the present invention, an ink-jet ink can include a polymer-dispersed pigment dispersed in a liquid vehicle. The polymer-dispersed pigment can be a pigment encapsulated with a polymer. Typically, the polymer has both hydrophilic groups and hydrophobic groups. In this manner, the hydrophobic group can be configured to attach or adhere to a surface of the pigment, while the hydrophilic group faces outward toward the liquid vehicle. Such a polymer can be formed using any known polymerization process. Most often, the polymer can be a polymerization product of a plurality of monomers, at least some of which having hydrophilic groups and others having hydrophobic groups. Additionally, the polymer-dispersed pigments of the present invention can be stable in the liquid vehicle at a near neutral pH of from about 5.5 to about 8.5. In some embodiments of the present invention, the polymer-dispersed pigments can be stable at a pH range from about 6.5 to about 7.5.

An ink-jet ink which is stable at near neutral pH offers a wide variety of benefits. Some of these benefits include alleviation of incompatibility with ink-jet pen architecture, amelioration of adverse reactions with substrate materials, and improved control and increased options when choosing a bleed control mechanism. For example, pigments can be polymer-dispersed in accordance with the present invention to produce an anionically dispersed ink-jet pigment. Similarly, a second pigment can be dispersed using known methods to produce a cationically dispersed pigment. Thus, the two ink-jet inks can be designed to resist bleed while also allowing for near neutral pH of each ink-jet ink. In this way, various color-to-color or color-to-black bleed control mechanisms can be developed at near neutral pH.

In one aspect of the present invention, the hydrophilic groups can be selected from the group consisting of sulfonic acids, fluoric acids, and α and/or β fluorinated carboxylic acids. Sulfonic acid hydrophilic groups can provide particularly good results. Various monomers can be used to introduce hydrophilic groups into the polymer. Generally, vinyl sulfonic acids and trifluoroacrylic acids can be effectively used for this purpose, although other monomers having acidic groups with a low pKa value can also be used. Typically, acidic groups having a pKa of from about 1 to about 5 can provide the desired effects near neutral pH range when used as dispersants. Vinyl sulfonic acids include a simple polymerizable vinyl group without also introducing extraneous functional groups which may inhibit desirable ink-jet ink properties. Non-limiting examples of specific suitable monomers which include a hydrophilic group include vinyl sulfonic acid, 4-styrenesulfonic acid, trifluoroacrylic acid, tetrafluorostyrene-4-carboxylic acid, α-trifluoromethyl acrylic acid, and difluoromaleic anhydride. In some cases, the strong acid group can be blocked during polymerization, e.g., emulsion polymerization, with a blocking group. Subsequent to polymerization, the blocking group can be removed. Those skilled in the art are familiar with such methods and can apply such principles to methods and materials of the present invention.

The quantity of hydrophilic groups within the polymer can vary considerably depending on the specific monomers used. Any quantity which is functional to provide the above listed pH ranges can be used. Typically, the monomer providing the hydrophilic group can comprise from about 10 wt % to about 50 wt % of the total monomers used to form the polymer. In some aspects, the monomer having the hydrophilic group can be from about 15 wt % to about 35 wt %.

Similarly, the compositions of the present invention also include a hydrophobic group within the polymer to provide attachment to the surface of the pigments. Suitable hydrophobic groups can depend on the specific pigment and the liquid carrier. However, non-limiting examples of suitable hydrophobic groups include aromatics such as phenyl, tolyl, benzyl, and the like. The hydrophobic groups can be introduced into the polymer using any number of monomers. The most common monomer suitable for this purpose is styrene. However, other monomers such as cinnamic acid, 4-methylstyrene, and 3-phenylpropene can also be used.

The quantity of hydrophobic groups can be sufficient to provide attachment to a particular pigment. The hydrophobic group can be covalently attached to a surface of the pigment or merely attracted thereto via intermolecular forces. Thus, the quantity of monomers containing hydrophobic groups can vary. As a general guideline, monomers containing hydrophobic groups can comprise from about 25 wt % to about 80 wt % of the monomers used to form the polymer, and in some aspects can be from about 40 wt % to about 70 wt %. Further, embodiments having a lower weight percent of monomers containing hydrophobic groups, e.g., less than about 45 wt % depending on the specific monomer, can include an additional monomer to provide supplemental steric stabilization. Examples of suitable additional monomers which provide steric stabilization include, but are not limited to, maleic acid, oligomers such as polyethylene glycols (PEO), polypropylene glycols (PPO), PEO and/or PPO esters of acrylic acid, and the like.

Similarly, the polymer can be a polymerization product of monomers containing hydrophilic groups, monomers containing hydrophobic groups, and a third monomer. The third monomer can be nearly any monomer commonly used in forming polymeric dispersants. Suitable third monomers include, but are not limited to, acrylics such as butyl acrylate, methacrylic acid, and the like. In many embodiments of the present invention, the third monomer can comprise from about 0 wt % to about 50 wt % of the polymer, as long as the final ink-jet ink remains stable at a near neutral pH and can at least partially encapsulate the desired pigment. Still further, additional monomers can also be used, e.g., a fourth, fifth, sixth monomer, etc.

When selecting polymers for use in encapsulating pigments, several properties or conditions can be evaluated. For example, polymeric molecular weight and acidity can be considered. Though any functional molecular weight can be used, it has been discovered that polymers having a molecular weight from about 1,000 Mw to about 50,000 Mw can be used, while those having a molecular weight from about 5,000 Mw to about 20,000 Mw are particularly desirable for use. The higher molecular weight polymers tend to provide better durability, but also result in higher ink viscosity, which can be problematic for thermal ink-jet applications. However, there is increased particle interaction with the liquid vehicle and with other particles when the polymer strands are long. In addition, highly acidic ink-jet inks tend to have poor water resistance.

The encapsulating polymers of the present invention can be used in conjunction with more commonly used polymers. Thus, the encapsulating polymers can be used in addition to traditional dispersing polymers, as long as the overall properties of the ink-jet ink with respect to pH and stability are maintained. Alternatively, hydrophilic and hydrophobic monomers can be incorporated into various polymers such as styrene-acrylics, styrene maleic anhydrides, polyethylene imine/phthalic anhydrides, polyethylene imine/phenylsuccinic anhydrides, polyethylene imine/succinic anhydrides, pentaethylene hexamines, polyethylene imines, polyurethanes, polyureas, acrylic polymers, vinyl polymers, polypyrrolidones, epoxies, polyesters, polysaccharides, polypeptides, celluloses, polyquats, polyamines, and copolymers thereof.

The amount of polymer in any particular ink-jet ink composition can vary depending on the specific polymers and required ink-jettability parameters such as viscosity, orifice size, pigment concentration, etc. Typically, the polymer can comprise from about 0.5 wt % to about 30 wt % of the ink-jet ink of the present invention, and in some embodiments can range from about 1 wt % to about 15 wt %.

Based on the description contained herein, those skilled in the art can design a number of specific polymers which can be used to disperse various pigments. Suitable polymers can be block copolymers, random copolymers, or the like, which can be formed via any known polymerization technique including, but not limited to, ionic polymerization, emulsion polymerization, and other known techniques. For example, U.S. Pat. No. 4,552,939, which is incorporated herein by reference, discloses one suitable suspension polymerization process. Several specific polymers are described below for exemplary purposes. Additional modifications and variations to these polymers can be made based on the disclosure herein.

In one aspect, the polymer can be styrene-vinylsulfonic acid copolymer having the basic chemical structure as shown in Equation 1.

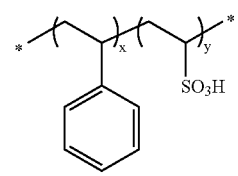

Equation 1 where x can be from 10 to 500 and y can be from 2 to 250.

In another aspect, the polymer can be styrene-methacrylic acid-vinylsulfonic acid copolymer with optional butyl acrylate groups having the basic chemical structure as shown in Equation 2.

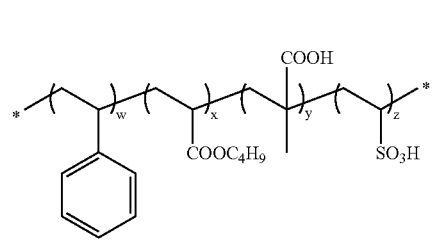

Equation 2 where w can be from 10 to 500, x can be from 0 to 300, y can be from 5 to 200, and z can be from 2 to 250.

In yet another aspect, the polymer can be styrene-vinylsulfonic acid copolymer with optional trifluoroacrylic acid groups having the basic chemical structure as shown in Equation 3.

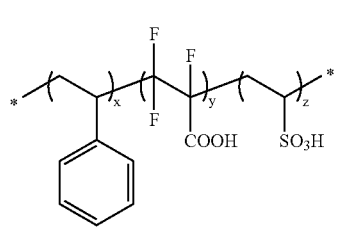

Equation 3 where x can be from 10 to 500, y can be from 0 to 300, and z can be from 2 to 250.

In still another aspect, the polymer can be styrene-vinylsulfonic acid copolymer with optional α-(trifluoromethyl) acrylic acid having the basic chemical structure as shown in Equation 4.

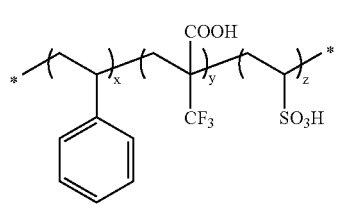

Equation 4 where x can be from 10 to 500, y can be from 0 to 300, and z can be from 2 to 250.

In another aspect, the polymer can be styrene-trifluoroacrylic acid copolymer having the basic chemical structure as shown in Equation 5.

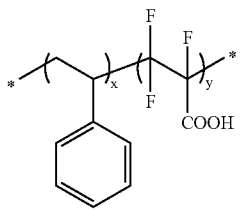

Equation 5 where x can be from 10 to 500 and y can be from 5 to 400.

Further, Equations 1 through 5 are not intended to indicate actual bonding within the polymers and therefore do not necessarily indicate block copolymers. The values w, x, y and z merely indicate number of repeating groups within a polymer and not bonding order. For example, the above equations describe polymers which are often randomly polymerized with the identified repeating groups.

Additionally, the ink-jet ink can include a suitable liquid vehicle. Examples of suitable liquid vehicles include, but are not limited to, water, alcohols, and the like. Typically the ink-jet ink compositions of the present invention can have a viscosity of between about 0.8 cps to about 15 cps, and in one embodiment, can be from about 0.8 cps to about 8 cps. In another aspect of the present invention, the liquid vehicle can comprise from about 70 wt % to about 99 wt % of the ink-jet ink composition. Further, the ink-jet ink compositions of the present invention can include additional components. For example, binders, latex particulates, UV curable materials, plasticizers, salts, buffers, biocides, surfactants, solvents, co-solvents, viscosity modifiers, sequestering agents, stabilizing agents, humectants, and/or other known additives can be included in the liquid vehicle or ink-jet ink composition.

Classes of co-solvents that can be used include water soluble organic solvents such as, but not limited to, aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs of polyethylene glycol alkyl ethers, N-alkyl caprolactams, unsubstituted caprolactams, both substituted and unsubstituted formamides, both substituted and unsubstituted acetamides, and the like. Specific examples of common co-solvents that can be used include trimethylolpropane, 2-pyrrolidinone, and 1,5-pentanediol, 2-ethyl-2-hydroxymethyl-1,3-propanediol, diethylene glycol, 3-methoxybutanol, and 1,3-dimethyl-2-imidazolidinone. Co-solvents can be added to reduce the rate of evaporation of water in the ink-jet to minimize clogging or other properties of the ink such as viscosity, pH, surface tension, optical density, and print quality. The co-solvent concentration can range from about 3 wt % to about 50 wt %, and in one embodiment is from about 10 wt % to about 30 wt %. Multiple co-solvents can also be used, as is known in the art.

In an additional aspect of the present invention, binders can be included which act to secure the colorants on the substrate. Binders suitable for use in the present invention typically have a molecular weight of from about 1,000 Mw to about 20,000 Mw. Non-limiting examples of binders include polyester, polyester-melanine, styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl naphthalene-acrylic acid copolymers, vinyl naphthalene-maleic acid copolymers, and salts thereof.

One or more of various surfactants can also be used as are known by those skilled in the art of ink formulation. Non-limiting examples of suitable surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, commercial products such as TERGITOLS, SURFYNOLS, ZONYLS, TRAITS, MERPOLS, and combinations thereof. The amount of surfactant added to the ink-jet inks of this invention can range from 0 wt % to 10 wt %.

Consistent with the formulation of this invention, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Several non-limiting examples of suitable biocides include benzoate salts, sorbate salts, commercial products such as NUOSEPT (Nudex, Inc., a division of Huls America), UCARCIDE (Union Carbide), VANCIDE (RT Vanderbilt Co.) and PROXEL (ICI Americas), and other known biocides. Typically, such biocides comprise less than about 5 wt % of the ink-jet ink composition and often from about 0.1 wt % to about 0.25 wt %.

Sequestering agents, such as EDTA (ethylenediaminetetraacetic acid), may be included to eliminate the deleterious effects of heavy metal impurities. Such sequestering agents typically comprise from 0 wt % to 2 wt % of the ink-jet ink compositions. Viscosity modifiers may also be present, as well as other additives known to those skilled in the art to modify properties of the ink as desired. Such additives can be present in the ink-jet ink compositions at from 0 wt % to 20 wt %.

Various buffering agents or pH adjusting agents can also be optionally used in the ink-jet ink compositions of the present invention. Typical buffering agents include such pH control solutions as hydroxides of alkali metals and amines, such as lithium hydroxide, sodium hydroxide, potassium hydroxide; citric acid; amines such as triethanolamine, diethanolamine, and dimethylethanolamine; hydrochloric acid; and other basic or acidic components which do not substantially interfere with the characteristics of the present invention. If used, buffering agents typically comprise less than about 10 wt % of the ink-jet ink composition.

Most commonly known pigments can be dispersed using the polymers and methods of the present invention. For example, the polymer-dispersed pigment can be black pigments, cyan pigments, magenta pigments, yellow pigments, and the like. Examples of black pigments that can be used include carbon pigments. The carbon pigment can be almost any commercially available carbon pigment that provides acceptable optical density and print characteristics. Carbon pigments suitable for use in the present invention include, without limitation, carbon black, graphite, vitreous carbon, charcoal, and combinations thereof. Such carbon pigments can be manufactured by a variety of known method such as a channel method, a contact method, a furnace method, an acetylene method, or a thermal method, and are commercially available from such vendors as Cabot Corporation, Columbian Chemicals Company, Degussa AG, and E.I. DuPont de Nemours and Company. Suitable carbon black pigments include, without limitation, Cabot pigments such as MONARCH 1400, MONARCH 1300, MONARCH 1100, MONARCH 1000, MONARCH 900, MONARCH 880, MONARCH 800, MONARCH 700, CAB-O-JET 200, and CAB-O-JET 300; Columbian pigments such as RAVEN 7000, RAVEN 5750, RAVEN 5250, RAVEN 5000, and RAVEN 3500; Degussa pigments such as Color Black FW 200, RAVEN FW 2, RAVEN FW 2V, RAVEN FW 1, RAVEN FW 18, RAVEN S160, RAVEN FW S170, Special Black 6, Special Black 5, Special Black 4A, Special Black 4, PRINTEX U, PRINTEX 140U, PRINTEX V, and PRINTEX 140V; and TIPURE R-101 available from Dupont. The above list of pigments includes unmodified pigment particulates, small molecule attached pigment particulates, and polymer-dispersed pigment particulates.

Similarly, a wide variety of colored pigments can be used with the present invention, therefore the following listing is not intended to be limiting. The following color pigments are available from Cabot Corp.: CABO-JET 250C, CABO-JET 260M, and CABO-JET 270Y. The following color pigments are available from BASF Corp.: PALIOGEN Orange, HELIOGEN Blue L 6901F, HELIOGEN Blue NBD 7010, HELIOGEN Blue K 7090, HELIOGEN Blue L 7101F, PALIOGEN Blue L 6470, HELIOGEN Green K 8683, and HELIOGEN Green L 9140. The following pigments are available from Ciba-Geigy Corp.: CHROMOPHTAL Yellow 3G, CHROMOPHTAL Yellow GR, CHROMOPHTAL Yellow 8G, IGRAZIN Yellow 5GT, IGPALITE Rubine 4BL, MONASTRAL Magenta, MONASTRAL Scarlet, MONASTRAL Violet R, MONASTRAL Red B, and MONASTRAL Violet Maroon B. The following pigments are available from Heubach Group: DALAMAR Yellow YT-858-D and HEUCOPHTHAL Blue G XBT-583D. The following pigments are available from Hoechst Specialty Chemicals: Permanent Yellow GR, Permanent Yellow G, Permanent Yellow DHG, Permanent Yellow NCG-71, Permanent Yellow GG, Hansa Yellow RA, Hansa Brilliant Yellow 5GX-$O_2$, Hansa Yellow-X, NOVOPERM Yellow HR, NOVOPERM Yellow FGL, Hansa Brilliant Yellow 10GX, Permanent Yellow G3R-01, HOSTAPERM Yellow H4G, HOSTAPERM Yellow H3G, Hostaperme Orange GR, HOSTAPERM Scarlet GO, and Permanent Rubine F6B. The following pigments are available from Mobay Corp.: QUINDO Magenta, INDOFAST Brilliant Scarlet, QUINDO Red R6700, QUINDO Red R6713, and INDOFAST Violet. The following pigments are available from Sun Chemical Corp.: L74-1357 Yellow, L75-1331 Yellow, and L75-2577 Yellow.

The encapsulating polymers of the present invention can be used to disperse pigments in a liquid vehicle. The pigments can be encapsulated either by ball milling or high shear mixing with a previously prepared polymer. Optionally, the pigment can be mixed with appropriate monomers as discussed previously. In this case, the polymer-dispersed pigment is prepared in situ and simultaneously with the polymer. Various methods of preparing dispersions are known and can be used in connection with the present invention. For example, WO2004/003090, U.S. Pat. No. 4,818,783 and U.S. Pat. No. 5,556,583, which are each incorporated herein by reference in their entireties, disclose several suitable methods of preparing dispersions.

In yet another alternative, the encapsulating polymer can be covalently attached to the pigment surface via known methods. For example, U.S. Pat. Nos. 5,554,739 and 5,707,432 disclose methods of functionalizing carbon materials using diazonium salts, each of which is incorporated herein by reference in their entireties. Such functionalized carbon pigments can be attached to the encapsulating polymers in accordance with an embodiment of the present invention.

The polymers discussed above can be incorporated as part of a system for printing an image. Such a system can include a substrate and a first ink-jet pen containing a first ink-jet ink configured for printing on the substrate. The first ink-jet ink can be a polymer-dispersed pigment dispersed in a liquid vehicle in accordance with the principles described herein. The pigment can be either a black or colored pigment. Additional ink-jet pens containing ink-jet inks can be optionally added to this system. For example, a multi-color system for producing full color images can include cyan, magenta, yellow, and/or black pigments. In one aspect of the present invention, each ink-jet ink can be produced in accordance with the principles of the present invention which are stable at near neutral pH.

Alternatively, the composition of each ink-jet ink can vary depending on various factors such as the bleed control mechanism used. For example, black-to-color bleed control can be provided by preparing anionically-dispersed color ink-jet inks in accordance with the present invention and then preparing cationically-dispersed black ink-jet inks. Thus, printing a cationically-dispersed ink near an anionically-dispersed ink results in reduced bleed. Therefore, the polymer-dispersed pigments of the present invention which are stable at near neutral pH provide an additional benefit of controlling bleed when printed along with a cationic ink.

In yet another alternative embodiment, the additional ink-jet pens can contain ink-jettable fluids which may or may not contain a pigment or other colorant. More specifically, the additional ink-jet fluids can include components such as fixers, pigments, dyes, or combinations of these components. Thus, in some embodiments, at least one ink-jet pen can be an ink-jet fluid which includes a fixer composition configured to react with one or more of previously printed ink-jet ink compositions subsequent to printing on the substrate. Various fixer compositions are known to those skilled in the art and can be readily prepared.

EXAMPLE

The following example illustrates an illustrative embodiment of the invention. However, it is to be understood that the following is only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following example provides further detail in connection with what is presently deemed to be a practical embodiment of the invention.

Styrene-Vinyl Sulfonic Acid Copolymer Dispersed Blue Pigment

A copolymer of styrene and vinyl sulfonic acid can be prepared by suspension polymerization. In this procedure, 0.1 g of sodium dodecylsulfate, 1.5 g of stearic acid, 1.5 g of polyethylene oxide, and 2.19 g of azo-bis-isobutyronitrile are dissolved in 500 ml of deionized water to form a mixture. To this mixture is added 104 g of styrene and 115 g of the trioctylammonium salt of vinyl sulfonic acid. The solution is then purged with nitrogen for 20 minutes. The solution is stirred and heated to 80° C. where the temperature is maintained for 20 hours and stirring is continued throughout the process to form the copolymer. After cooling, the polymer is extracted from the reaction mixture using toluene, resulting in a toluene-copolymer mixture. After removing the toluene under vacuum, the copolymer is dried in a vacuum oven. The copolymer is then converted to its sodium salt by dissolving the copolymer in toluene and treating with a sufficient amount of sodium methoxide to neutralize all the trioctylammonium salts of the sulfonate groups. Evaporation of toluene under vacuum and drying yields the sodium salt. This procedure results in a styrene-vinyl sulfonic acid copolymer having a molecular weight of about 9800.

A stable dispersion of polymer-dispersed pigment is prepared using the copolymer of styrene and vinyl sulfonic acid. Specifically, 15 g of the styrene-vinyl sulfonic acid copolymer, 1 g of triethanolamine, and 52.5 g of deionized water are kneaded with 30 g of pigment blue 15:3 and 1.5 g of glycerin. To this kneaded mixture is added 100 g of additional deionized water and steel balls which are then circulated through a media mill for grinding. Removal of the steel balls by centrifugation and filtration of the dispersion through a 1.2 μm filter results in an aqueous dispersion having 15 wt % pigment.

An ink-jet ink is prepared by adding 66.7 g of a liquid vehicle described below into 33.3 g of the aqueous dispersion. The liquid vehicle includes 5 parts by weight of 2-pyrrolidone, 5 parts by weight of glycerin, 1 part by weight of tetramethylurea, 1 part by weight of triethanolamine, 1 part by weight of ZONYL, 0.5 part by weight of PROXEL, and a balance of deionized water. The resulting ink-jet ink includes the polymer-dispersed blue pigment which is stable at neutral and near neutral pH and has acceptable print quality.

While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

What is claimed is:

1. An ink-jet ink, comprising
   a) a liquid vehicle; and
   b) a polymer-dispersed pigment dispersed in the liquid vehicle, said polymer-dispersed pigment including a pigment encapsulated with a polymer, said polymer being a polymerization product of at least a first monomer having a hydrophilic group, and a second monomer having a hydrophobic group, said polymer including styrene-trifluoroacrylic acid-vinylsulfonic acid copolymer, styrene-α(trifluoromethyl)acrylic acid-vinylsulfonic acid copolymer, or styrene-trifluoroacrylic acid copolymer, wherein the polymer-dispersed pigment is stable in the liquid vehicle at a pH from about 5.5 to about 8.5, and wherein the first monomer is used to form from about 10 wt % to about 50 wt % of the polymer or the second monomer is used to form from about 25 wt % to about 80 wt % of the polymer.

2. The ink-jet ink of claim 1, wherein the first monomer is used to form from about 10 wt % to about 50 wt % of the polymer.

3. The ink-jet ink of claim 1, wherein the second monomer is used to form from about 25 wt % to about 80 wt % of the polymer.

4. The ink-jet ink of claim 1, wherein the polymer is the styrene-trifluoroacrylic acid-vinylsulfonic acid copolymer.

5. The ink-jet ink of claim 1, wherein the polymer is the styrene-α-(trifluoromethyl)acrylic acid-vinylsulfonic acid copolymer.

6. The ink-jet ink of claim 1, wherein the polymer is the styrene-trifluoro acrylic acid copolymer.

7. The ink-jet ink of claim 1, wherein the polymer-dispersed pigment is stable in the liquid vehicle at a pH from about 6.5 to about 7.5.

8. A system for printing an image, comprising:
   a) a substrate; and
   b) a first ink-jet pen containing a first ink-jet ink, said first ink-jet ink pen configured for printing the first ink-jet ink on the substrate, said first ink-jet ink including a first polymer-dispensed pigment dispersed in a first liquid vehicle, said polymer-dispersed pigment having a first pigment encapsulated with a first polymer, said polymer being a polymerization product of at least a first monomer having a hydrophilic group and a second monomer having a hydrophobic group, said polymer selected from the group consisting of styrene-trifluoroacrylic acid-vinylsulfonic acid copolymer, styrene-α-(trifluoromethyl)acrylic acid-vinylsulfonic acid copolymer, and styrene-trifluoroacrylic acid copolymer, wherein the polymer-dispersed pigment is stable in the liquid vehicle at a pH from about 5:5 to about 8.5, and wherein the first monomer is used to form from about 10 wt % to about 50 wt % of the polymer or the second monomer is used to form from about 25 wt % to about 80 wt % of the polymer.

9. The system of claim 8, wherein the first monomer is used to form from about 10 wt % to about 50 wt % of the polymer.

10. The system of claim 8, wherein the second monomer is used to form from about 25 wt % to about 80 wt % of the polymer.

11. The system of claim 8, further comprising a second ink-jet pen containing a second ink-jet fluid, said second ink-jet fluid including a cationic component configured for reduced bleed when printed adjacent to the first ink-jet ink.

12. The system of claim 11, wherein said second ink-jet fluid includes a pigment.

13. The system of claim 8, wherein the first polymer-dispersed pigment is stable in the first liquid vehicle at a pH from about 6.5 to about 7.5.

14. A method of printing an image, comprising ink-jetting an ink-jet ink onto a media substrate, said ink-jet ink including:
   a) a liquid vehicle; and
   b) a polymer-dispersed pigment dispersed in the liquid vehicle, said polymer-dispersed pigment including a pigment encapsulated with a polymer, said polymer being a polymerization product of at least a first monomer having a hydrophilic group, and a second monomer having a hydrophobic group, said polymer selected from the group consisting of styrene-trifluoroacrylic acid-vinylsulfonic acid copolymer, styrene-α-(trifluoromethyl)acrylic acid-vinylsulfonic acid copolymer, and styrene-trifluoroacrylic acid copolymer, wherein the polymer-dispersed dispersed pigment is stable in the liquid vehicle at a pH of from about 5.5 to about 8.5, and wherein the first monomer is used to form from about 10 wt % to about 50 wt % of the polymer or the second monomer is used to form from about 25 wt % to about 80 wt % of the polymer.

15. The method of claim 14, wherein the first monomer is used to form from about 10 wt % to about 50 wt % of the polymer.

16. The method in of claim 14, wherein the second monomer is used to form front about 25 wt % to about 80 wt % of the polymer.

17. The method of claim 14, further comprising ink-jetting a second ink-jet fluid, said second ink-jet fluid including a cationic component configured for reduced bleed when printed adjacent to the first ink-jet ink.

18. The method of claim 17, wherein the second ink-jet fluid includes a cationically-dispersed pigment.

19. The method of claim 14, wherein the polymer-dispersed pigment is stable in the liquid vehicle at a pH from about 6.5 to about 7.5.

20. An ink-jet ink, comprising
   a) a liquid vehicle; and
   b) a polymer-dispersed pigment dispersed in the liquid vehicle, said polymer-dispersed pigment including a pigment encapsulated with a polymer, said polymer being a polymerization product of at least a first monomer having a hydrophilic group selected from the group consisting of α-fluorocarboxylic acids, β-fluorocarboxylic acids, and combinations thereof, and a second monomer having a hydrophobic group, wherein the polymer-dispersed pigment is stable in the liquid vehicle at a pH from about 5.5 to about 8.5.

21. The ink-jet ink of claim 20, wherein the first monomer is used to form from about 10 wt % to about 50 wt % of the polymer.

22. The ink-jet ink of claim 20, wherein the hydrophobic group is selected from the group consisting of aromatic, aliphatic, alicyclic, heterocyclic, and combinations thereof.

23. The ink-jet ink of claim 20, wherein the hydrophobic group is phenyl.

24. The ink-jet ink of claim 20, wherein the second monomer is selected from the group consisting of styrene, cinnamic acid, 4-alkylstyrene, and combinations thereof.

25. The ink-jet ink of claim 20, wherein the second monomer is used to form from about 25 wt % to about 80 wt % of the polymer.

26. The ink-jet ink claim 20, wherein the polymer-dispersed pigment is stable in the liquid vehicle at a pH from about 6.5 to about 7.5.

* * * * *

UNITED STATES PATENT AND TRADEMARK OFFICE
CERTIFICATE OF CORRECTION

| | | |
|---|---|---|
| PATENT NO. | : 7,332,532 B2 | Page 1 of 1 |
| APPLICATION NO. | : 10/824173 | |
| DATED | : February 19, 2008 | |
| INVENTOR(S) | : Sundar Vasudevan | |

It is certified that error appears in the above-identified patent and that said Letters Patent is hereby corrected as shown below:

In column 8, line 19, delete "TRAITS" and insert -- TRITONS --, therefor.

In column 9, line 44, delete "$O_2$" and insert -- 02 --, therefor.

In column 11, line 48, in Claim 1, after "comprising" insert -- : --.

In column 11, line 57, in Claim 1, delete "styrene-α(trifluoromethyl)acrylic" and insert -- styrene-α-(trifluoromethyl)acrylic --, therefor.

In column 11, line 63, in Claim 1, after "used to" insert -- form --.

In column 12, line 19, in Claim 8, delete "dispensed" and insert -- dispersed --, therefor.

In column 12, line 30, in Claim 8, delete "5:5" and insert -- 5.5 --, therefor.

In column 12, line 64, in Claim 14, delete "dispersed" before "pigment".

In column 13, line 6, in Claim 16, after "method" delete "in".

In column 13, line 7, in Claim 16, delete "front" and insert -- from --, therefor.

In column 13, line 18, in Claim 20, after "comprising" insert -- : --.

In column 14, line 20, in Claim 26, insert -- of -- before "claim".

Signed and Sealed this

Fifteenth Day of June, 2010

David J. Kappos
*Director of the United States Patent and Trademark Office*